(12) United States Patent
Lawlor

(10) Patent No.: US 8,783,240 B2
(45) Date of Patent: Jul. 22, 2014

(54) TILE SAW WITH FREE-ROLLING WHEELS

(75) Inventor: Michael J. Lawlor, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 290 days.

(21) Appl. No.: 13/328,614

(22) Filed: Dec. 16, 2011

(65) Prior Publication Data

US 2013/0152754 A1 Jun. 20, 2013

(51) Int. Cl.
*B28D 7/04* (2006.01)

(52) U.S. Cl.
USPC .................. 125/35; 125/13.01; 125/23.02

(58) Field of Classification Search
USPC ............. 125/13.01, 13.03, 23.02, 35; 83/401, 83/435.11, 471, 477, 477.1, 477.2
See application file for complete search history.

(56) References Cited

U.S. PATENT DOCUMENTS

| | | | | |
|---|---|---|---|---|
| 3,807,095 A * | 4/1974 | Harding et al. | ............ | 125/13.03 |
| 3,970,127 A | 7/1976 | Thiele | | |
| 4,428,159 A * | 1/1984 | Sigetich et al. | ............... | 451/213 |
| 4,446,845 A * | 5/1984 | Harding | ............ | 125/13.03 |
| 5,457,915 A * | 10/1995 | Voege | ............ | 451/455 |
| 5,482,026 A * | 1/1996 | Russell | ............ | 125/12 |
| 5,676,124 A * | 10/1997 | Lee | ............ | 125/13.01 |
| 5,741,175 A * | 4/1998 | Voege | ............ | 451/455 |
| 6,000,387 A * | 12/1999 | Lee | ............ | 125/13.01 |
| 6,080,041 A | 6/2000 | Greenland | | |
| 6,119,676 A * | 9/2000 | Greenland | ............ | 125/35 |
| 6,276,990 B1 * | 8/2001 | Greenland | ............ | 451/11 |
| 6,347,624 B1 | 2/2002 | Smith et al. | | |
| 6,619,348 B2 | 9/2003 | Wang | | |
| 6,637,424 B1 * | 10/2003 | Fuhrman et al. | ................ | 125/35 |
| 6,845,768 B2 * | 1/2005 | O'Banion et al. | ......... | 125/23.02 |
| 7,059,370 B2 | 6/2006 | Wang | | |
| 7,308,844 B2 | 12/2007 | Sheddy et al. | | |
| 7,387,120 B2 | 6/2008 | O'Banion et al. | | |
| 7,438,098 B2 | 10/2008 | Liu et al. | | |
| 7,455,003 B2 | 11/2008 | Sheddy et al. | | |
| 7,490,643 B2 | 2/2009 | Liu et al. | | |
| 7,497,239 B2 | 3/2009 | Smith | | |
| 7,823,575 B2 * | 11/2010 | O'Banion et al. | ......... | 125/23.02 |
| 8,001,875 B2 * | 8/2011 | Sheddy et al. | ............. | 83/435.11 |
| 8,286,539 B2 * | 10/2012 | Sheddy et al. | ............. | 83/435.11 |
| 2005/0103175 A1 * | 5/2005 | O'Banion et al. | ........... | 83/477.2 |
| 2008/0216808 A1 * | 9/2008 | O'Banion et al. | ......... | 125/13.01 |

(Continued)

FOREIGN PATENT DOCUMENTS

CA   2 512 116 A1   1/2007
EP   1 000 720 A2   5/2000

(Continued)

OTHER PUBLICATIONS

International Search Report and Written Opinion in corresponding PCT application (i.e., PCT/US2012/069437), mailed May 2, 2013 (10 pages).

*Primary Examiner* — Eileen P. Morgan
(74) *Attorney, Agent, or Firm* — Maginot, Moore & Beck

(57) ABSTRACT

A saw system in one embodiment includes a base, a work support surface member supported by the base and including a work piece support surface defining a horizontal work piece support plane, and a plurality of wheels, each of the plurality of wheels engaged with at least one of the base and the work support surface member, wherein none of the plurality of wheels is attached to either the base or the work support surface member.

18 Claims, 6 Drawing Sheets

(56) References Cited

U.S. PATENT DOCUMENTS

| | | |
|---|---|---|
| 2009/0277315 A1* | 11/2009 | Ipatenco et al. ............... 83/171 |
| 2013/0055870 A1* | 3/2013 | Sheddy et al. ............. 83/435.11 |
| 2013/0055871 A1* | 3/2013 | Sheddy et al. ............. 83/435.12 |
| 2013/0152754 A1* | 6/2013 | Lawlor ....................... 83/435.11 |

FOREIGN PATENT DOCUMENTS

| | | |
|---|---|---|
| JP | S60 130746 U | 9/1985 |
| WO | 88/08769 A1 | 11/1988 |
| WO | 98/03099 A1 | 1/1998 |

\* cited by examiner

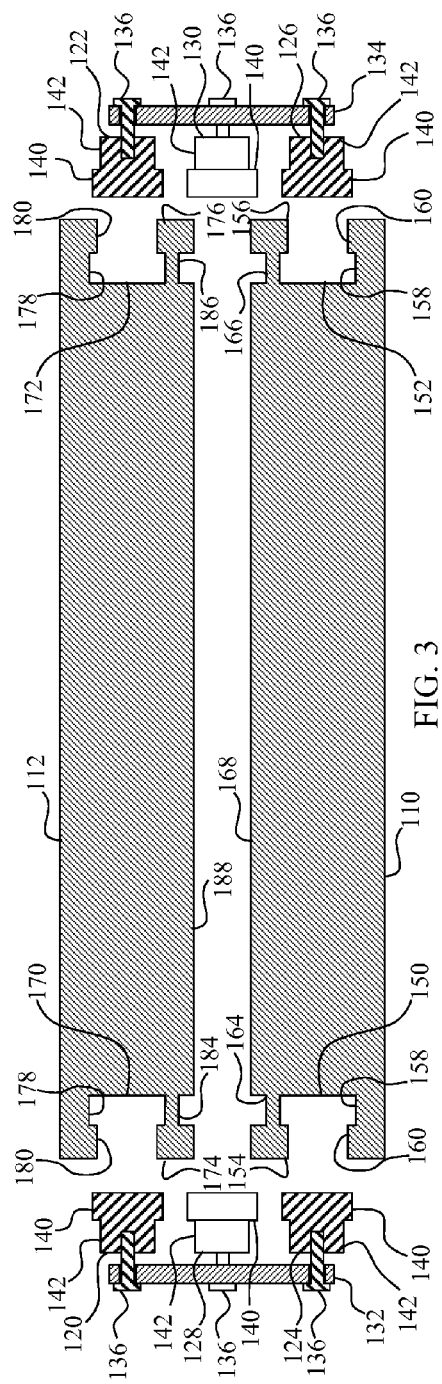
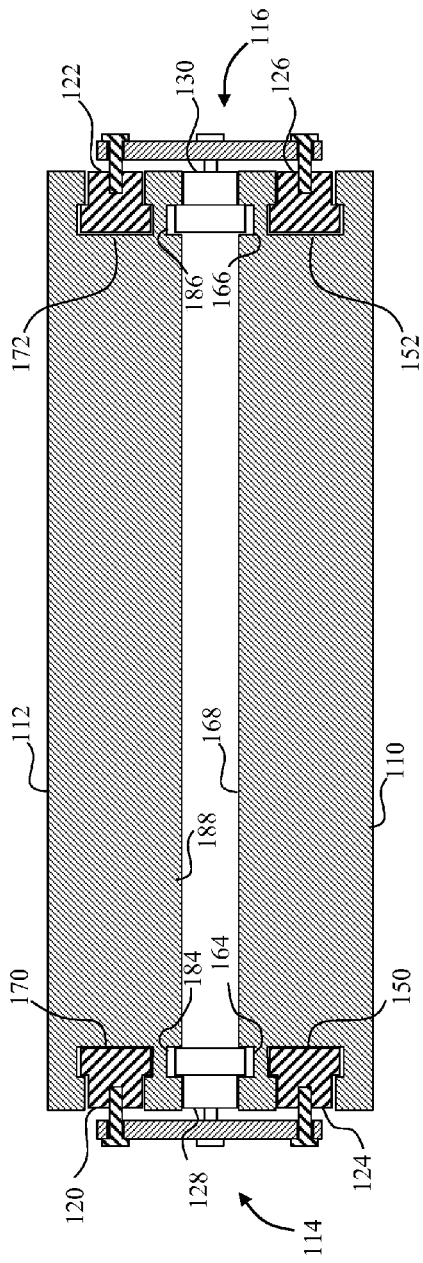
FIG. 3
FIG. 4

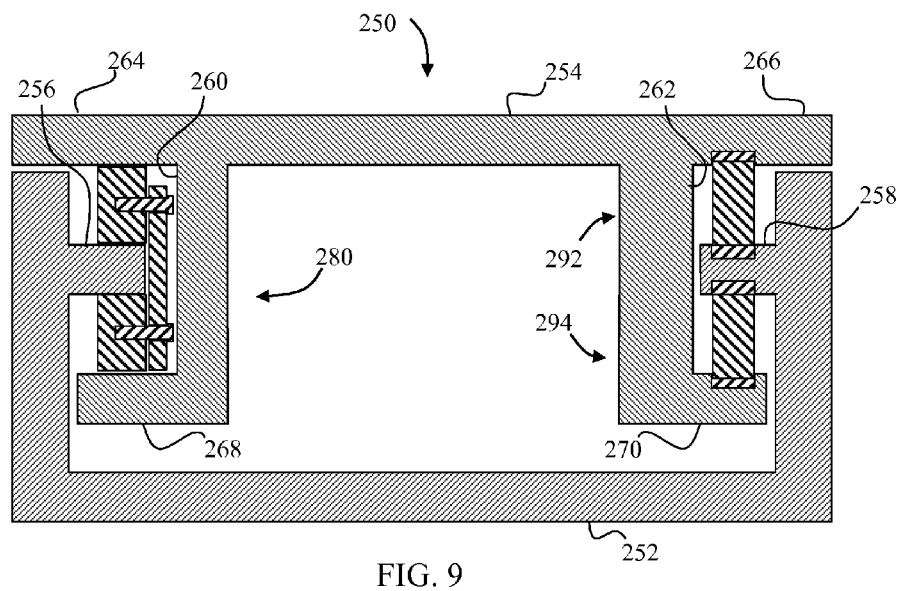
FIG. 9
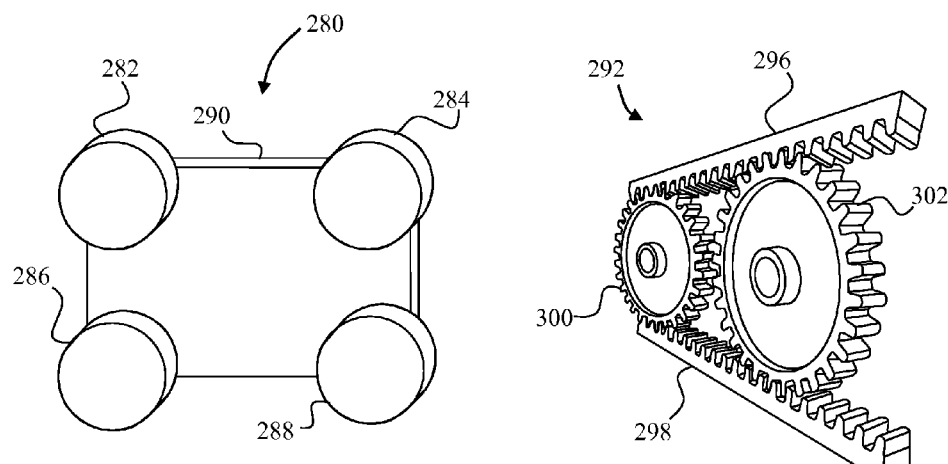
FIG. 10
FIG. 11

TILE SAW WITH FREE-ROLLING WHEELS

FIELD OF THE INVENTION

This patent relates generally to the field of devices used to cut tiles and other hard materials, including devices with movable work support surfaces.

BACKGROUND

Tile saws are widely used for cutting hard materials such as bricks and tiles. Tile saw systems typically include a power head assembly, a table, a base for supporting the table and a water tray located under the base. The system is configured to apply a stream of water to a blade held within the power head assembly. The water flows over the work piece and is collected in the water tray. The water is thus used to cool the blade and the work piece. Additionally, debris formed by cutting the work piece is entrapped in the water.

In some tile saw systems, the table upon which a work piece is supported is movable with respect to the power head assembly. This allows for increased control over the cut since the work piece can be secured to the table at a desired orientation. In such moving table systems, a rail structure may be provided on the base. The rail structure is engaged by rollers attached to the table. By applying force to the table, the rollers roll along the rail system allowing the work piece to be brought into contact with the blade in the power head assembly.

While rail and roller system can be very effective in increasing the accuracy of cuts, the rail and roller system can significantly increase the bulk of the tile saw. For example, when cutting a twenty-four inch tile, the table must move at least 24 inches in order to pass the entire tile past the blade. If the tile is to be cut on a diagonal, then the work support surface must be capable of moving about 34 inches. A work support surface of nearly three feet in length is difficult to manipulate.

Moreover, a work support surface of increased length makes storage of the tile saw more inconvenient. Furthermore, users frequently desire to set up a tile saw in proximity to the location at which the tiles are to be installed. As the bulk of the tile saw is increased, the ability to easily transport and locate the tile saw at a work area is diminished.

What is needed is a saw system with a table assembly which can be used to guide movement of a work piece positioned thereon. What is further needed is a table assembly which allows a user to support and move larger work pieces without excessively increasing the footprint of the saw system.

SUMMARY

In accordance with one embodiment of the disclosure, a saw system includes a base, a work support surface member supported by the base and including a work piece support surface defining a horizontal work piece support plane, and a plurality of wheels, each of the plurality of wheels engaged with at least one of the base and the work support surface member, wherein none of the plurality of wheels is attached to either the base or the work support surface member.

In another embodiment, a saw system includes a table assembly with a base, a first wheel engaged with the base, a work support surface member defining a horizontal work piece support plane and movable with respect to the base along a cutting axis, and a second wheel engaged with the work support surface member, wherein the first wheel is not attached to the base or the work support surface member, the second wheel is not attached to the base or the work support surface member, and the first wheel and the second wheel are movable with respect to the base and the work support surface member along the cutting axis.

BRIEF DESCRIPTION OF THE DRAWINGS

FIG. 3 depicts a partially exploded end cross sectional view of the table assembly of FIG. 2;

FIG. 4 depicts an end cross sectional view of the table assembly of FIG. 2;

FIG. 9 depicts an end cross sectional view of an embodiment of a table assembly in accordance with principles of the present invention wherein wheels are contained within pockets defined by a work support member;

FIG. 10 depicts a perspective view of a carriage assembly of FIG. 9; and FIG. 11 depicts a perspective view of a rack and pinion arrangement of FIG. 9.

DESCRIPTION

Figure 1:
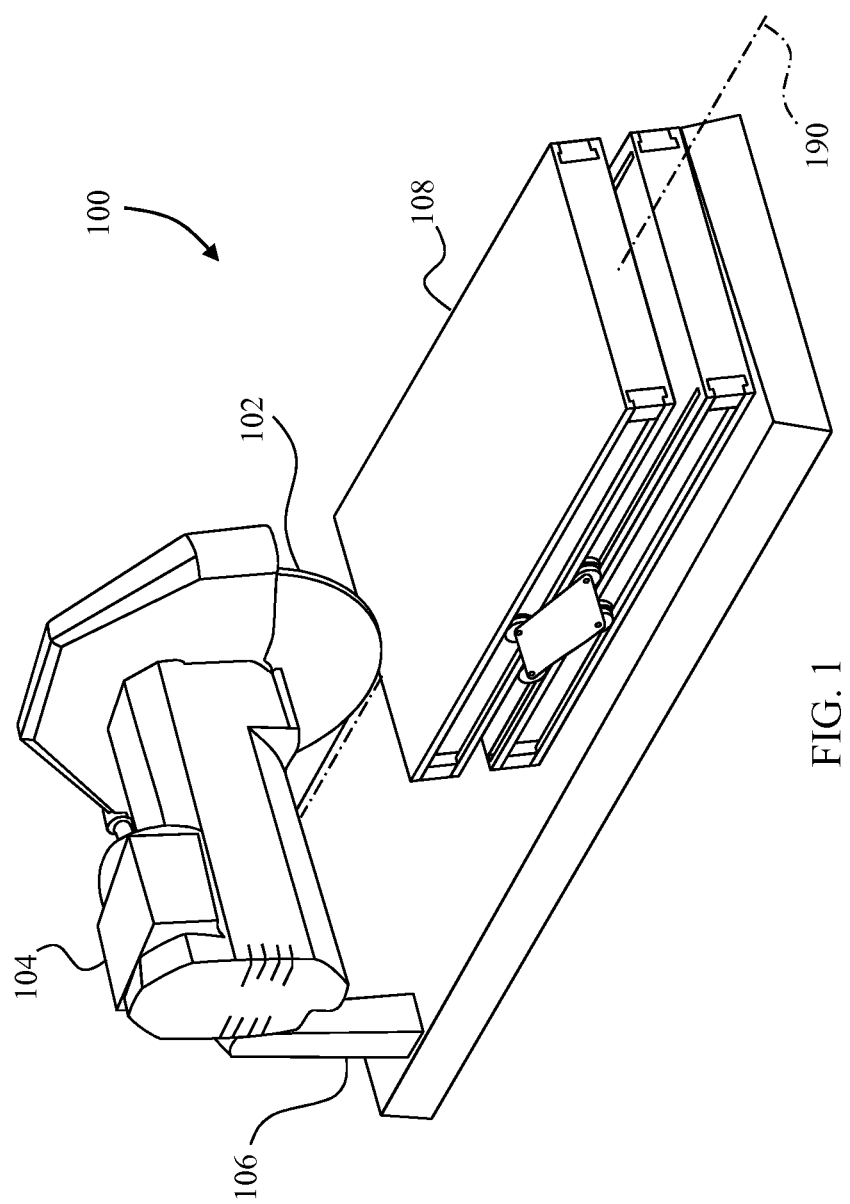
FIG. 1 depicts a perspective view of a tile saw system including a table assembly in accordance with principles of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the invention includes any alterations and modifications to the illustrated embodiments and includes further applications of the principles of the invention as would normally occur to one skilled in the art to which this invention pertains.

Figure 2:
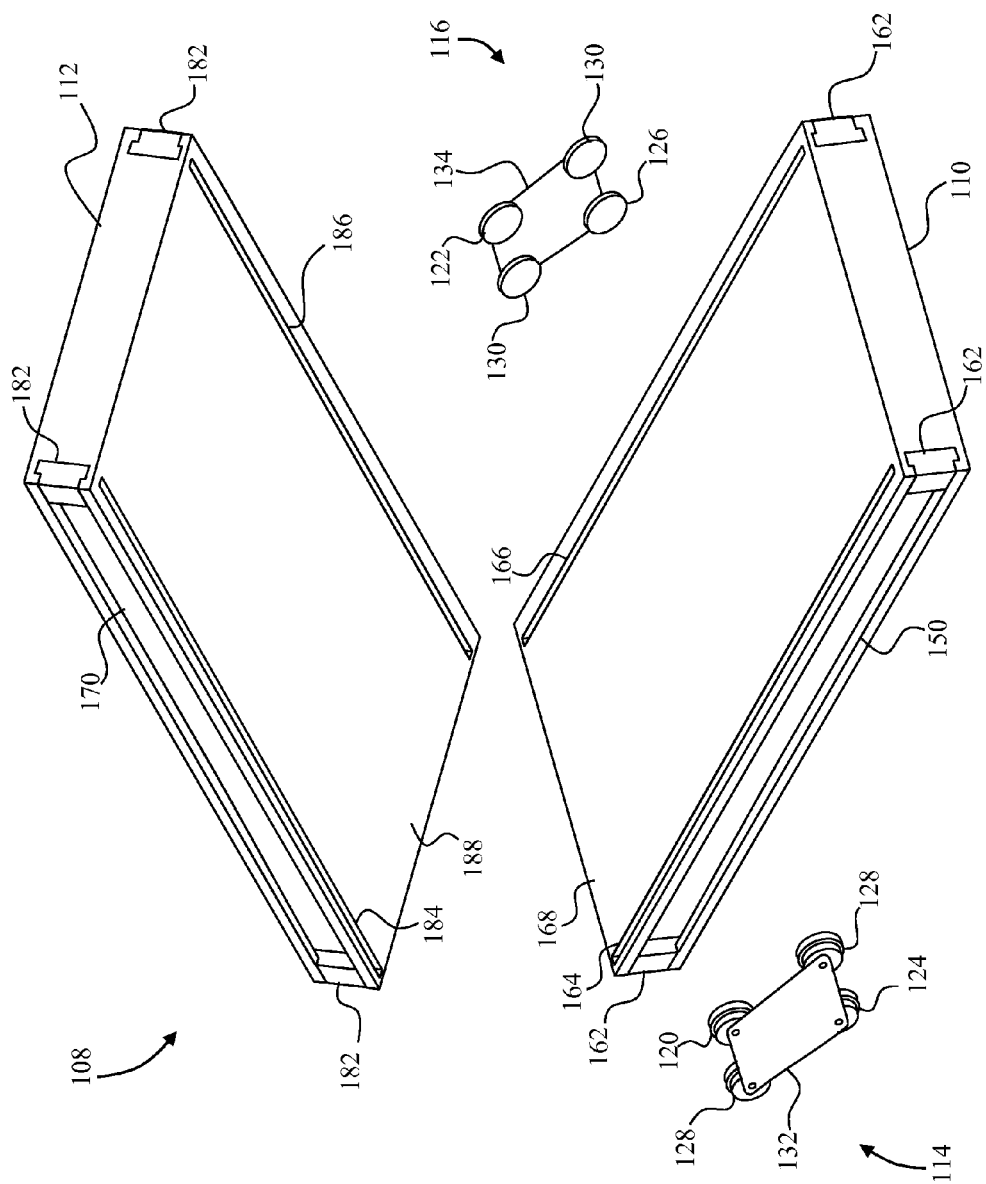
FIG. 2 depicts a splayed apart perspective view of the table assembly of FIG. 1.

FIG. 1 depicts a saw system 100. The saw system 100 includes a blade 102 which is rotatably driven by a power head assembly 104. A support arm 106 supports the power head assembly 104 and blade 102 above a table assembly 108. The table assembly 108, also shown in FIGS. 2 and 3, includes a base member 110, a work support member 112, and two wheel carriage assemblies 114/116.

The wheel carriage assemblies 114/116 in one embodiment are substantially identical and include upper wheel members 120/122, lower wheel members 124/126, and a pair of intermediate wheel members 128/130. Each of the wheel members 120/122, 124/126, and 128/130 is rotatably supported by a respective carriage 132/134 through a pin 136. Each of the wheel members 120/122, 124/126, and 128/130 in this embodiment are identical and include a large diameter portion 140 and a small diameter portion 142 seen most clearly in FIG. 3.

The base member 110, which in some embodiments is fixedly positioned with respect to the support arm 106, includes two guide slots 150 and 152 which extend inwardly from opposite sides 154/156 of the base member 110. Each of the guide slots 150/152 includes a respective large diameter portion 158 and small diameter portion 160. Stop plugs 162 (see FIG. 2) are located at the end portions of each of the guide slots 150/152. A pair of guide slots 164/166 extends inwardly from the upper surface 168 of the base member 110. The guide slots 164/166 are parallel to one another. Each of the guide slots 164/166 is also parallel to, and directly above, one of the large diameter portions 158.

The work support member 112 includes two guide slots 170 and 172 which extend inwardly from opposite sides 174/176 of the work support member 112. Each of the guide slots 170/172 includes a respective large diameter portion 178 and small diameter portion 180. Stop plugs 182 (see FIG. 2) are located at the end portions of each of the guide slots 170/172. A pair of guide slots 184/186 extends inwardly from the lower surface 188 of the work support member 112. The guide slots 184/186 are parallel to one another. Each of the guide slots 184/186 is also parallel to, and directly above, one of the large diameter portions 178. The upper surface of the work support member 112 defines a generally planar work piece support surface.

The large diameter portions 178 of the guide slots 150/152/170/172 are configured to receive the large diameter portions 140 of the wheels 120/122/124/126. Accordingly, when the table assembly 108 is assembled as shown in FIGS. 1 and 4, the upper wheel 120 is received within the guide slot 170 of the work support member 112 with the large diameter portion 140 of the wheel 120 within the large diameter portion 158 of the guide slot 170 and the small diameter portion 142 of the wheel 120 within the small diameter portion 160 of the guide slot 170. In like manner, the wheels 122, 124, and 126 are received within the guide slots 172, 150, and 152, respectively.

The engagement of the wheels 120/122/124/126 with the guide slots 170/172/150/152 keep the base member 110 and the work support member 112 assembled while allowing for movement of the carriages 114/116 with respect to both the base member 110 and the work support member 112. Accordingly, the work support member 112 is also movable with respect to the base member 110.

Stability of the work support member 112 with respect to the base member 110 is provided by the intermediate wheel members 128 and 130. Specifically, the lower surface 188 of the work support member 112 rests upon the small diameter portions 142 of the intermediate wheels 128/130 which in turn rest upon the upper surface 168 of the base member 110. By increasing the distance between the intermediate wheels 128 and/or the intermediate wheels 130, stability may be increased. In addition, the large diameter portion 140 of the intermediate wheel members 128 are received within the guide slots 164/184 while the large diameter portion 140 of the intermediate wheels 130 are received within the guide slots 166/186. Accordingly, the intermediate wheels 128/130 assist in maintaining the table assembly 108 in an assembled condition and guide movement of the carriage assemblies 114/116, and thus the work support member 112, along the upper surface 168 of the base member 110.

The table assembly 108 allows for a relatively long work piece to be cut by the blade 102 while maintaining a relatively small footprint in the configuration of FIG. 1. For example, to accommodate a longer work piece, a user simply pulls the work support member 112 away from the blade 102 along a cutting axis 190 (see FIG. 1). Such rearward movement of the work support member 112 results in rolling of the wheels 120/122/124/126/128/130. Accordingly, the work support member 112 moves away from the blade 102. More specifically, the lower surface 188 of the work support member 112 forces the wheels 128/130 to roll away from the blade 102. As the wheels 128/130 roll, the work support member 112 moves rearwardly with respect to the wheels 128/130.

Figure 5:
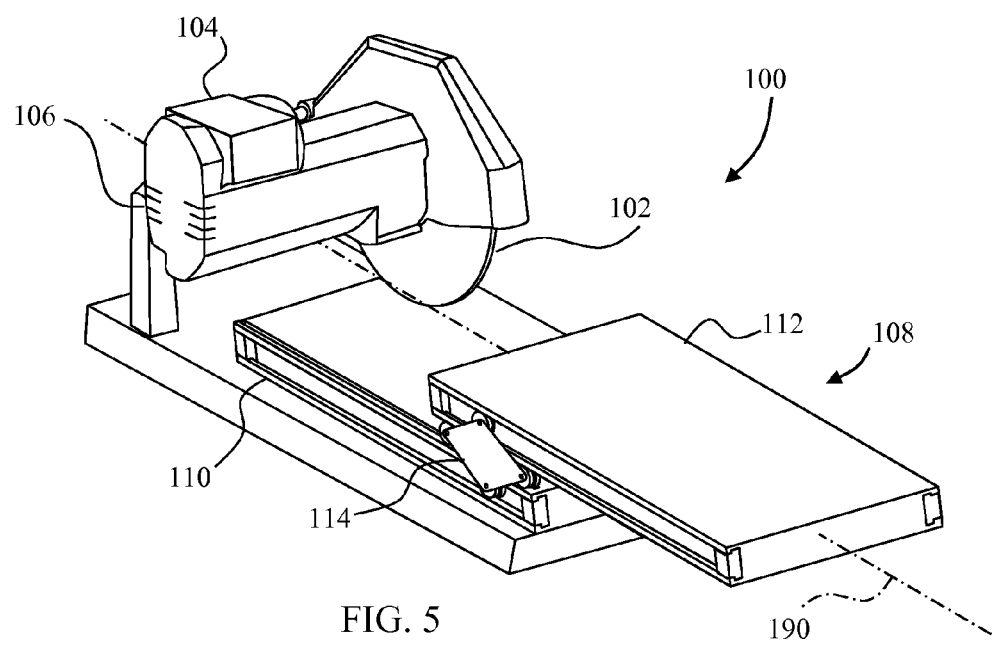
FIG. 5 depicts the saw assembly of FIG. 1 with the table assembly moved rearwardly along a cutting axis so as to allow a longer work piece to be positioned on the table assembly.

Rolling of the wheels 128/130 further results in rearward movement of the wheels 128/130 with respect to the base member 110. Accordingly, the carriage assemblies 114/116 move rearwardly as the work support member 112 moves rearwardly. The resulting configuration is depicted in FIG. 5, where the carriage assemblies 114 and 116 (116 is not shown in FIG. 5) are located at the rearward portion of the base member 110, while the forward portion of the work support member 112 is supported by the carriage assemblies 114/116.

Consequently, a work piece that is much longer than the work support member 112 can be positioned on the work support member 112. The work piece (not shown) may then be brought into contact with the blade 102 by moving the work support member 112 toward the blade 102. Movement of the work support member in a forwardly direction reverses the above described movements so that the work support member 112 may be returned to the configuration of FIG. 1.

Figure 6:
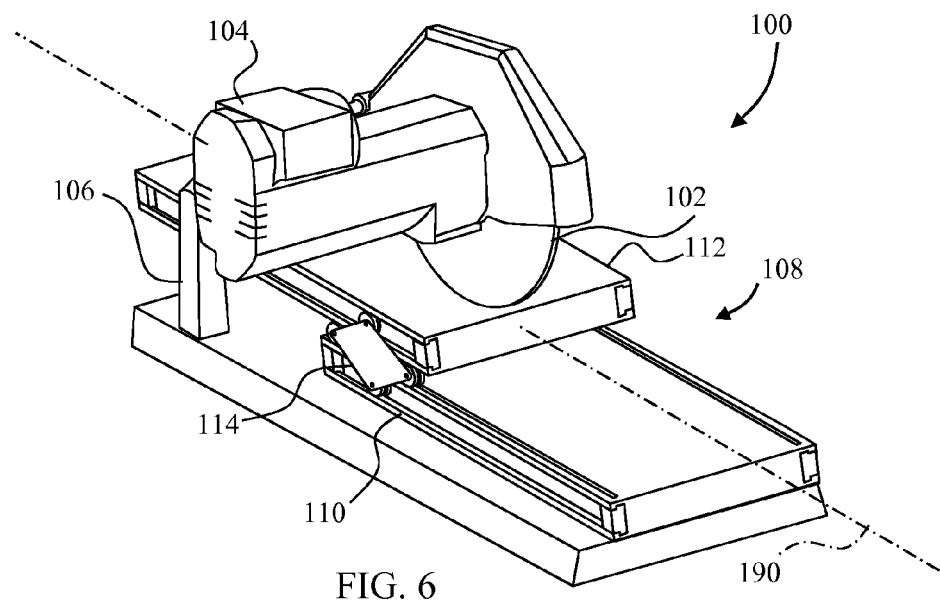
FIG. 6 depicts the saw assembly of FIG. 1 with the table assembly moved forwardly along a cutting axis so as to allow a longer work piece to be fully cut by the saw assembly.

Moreover, because the guide slots 150/152/164/166/170/172/184/186 extend along substantially the entire length of the base member 110 or support surface member 112 parallel to the cutting axis 190, which is the axis along which the work support surface 112 moves, the work support surface 112, and thus a work piece positioned thereon, can continue forwardly of the configuration of FIG. 1 to the configuration of FIG. 6. In FIG. 6, the carriage assemblies 114 and 116 (116 is not shown in FIG. 6) are located at the forward portion of the base member 110, while the rearward portion of the work support member 112 is supported by the carriage assemblies 114/116.

Figure 7:
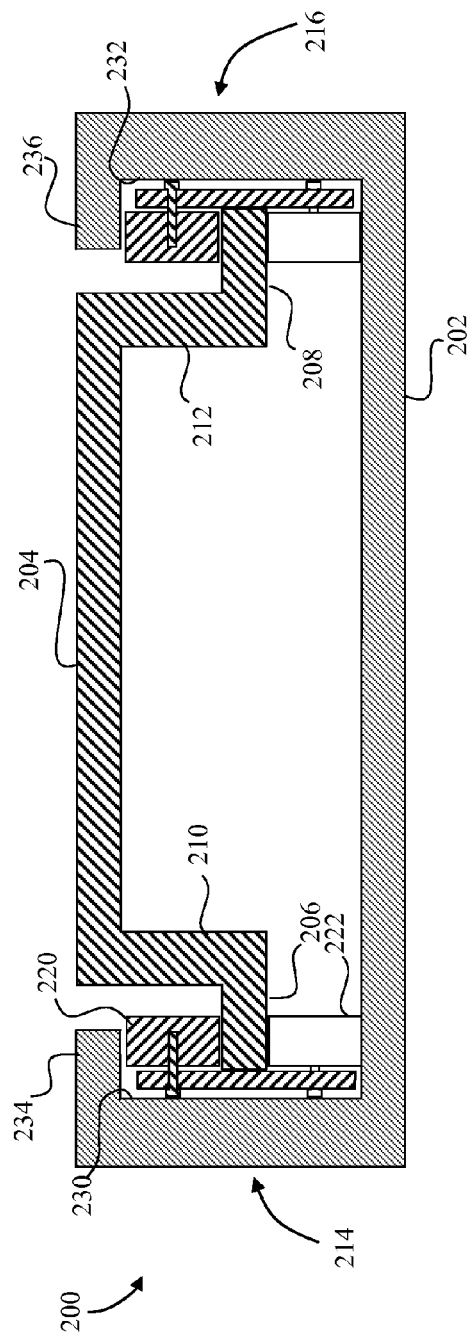
FIG. 7 depicts an end cross sectional view of an embodiment of a table assembly in accordance with principles of the present invention wherein wheels are contained within pockets defined by a base member.

FIG. 7 depicts a table assembly 200 that in some embodiments is used in place of the table assembly 108. The table assembly 200 includes a base member 202 and a support surface member 204. The support surface member 204 includes two flanges 206 and 208 which extend outwardly from rims 210 and 212, respectively. Two carriage assemblies 214 and 216 are positioned on the flanges 206 and 208, respectively.

Figure 8:
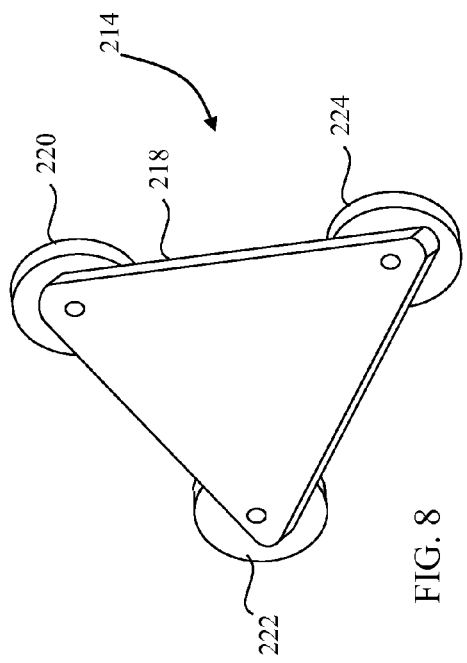
FIG. 8 depicts a perspective view of a carriage assembly of FIG. 7.

The carriage assemblies 214 and 216 are identical, and are described with reference to carriage assembly 214 which is also shown in FIG. 8. The carriage assembly 214 includes a carriage body 218 and three wheels 220, 222, and 224. Each of the wheels 218, 220, and 222 are in contact with the flange 206. The wheel 220 contacts an upper surface of the flange 206 while the wheels 222 and 224 contact a lower surface of the flange 206. The wheels 220/222/224 are also in contact with the base member 202 as described below.

The flanges 206/208 and the carriage assemblies 214/216 are located within pockets 230 and 232, respectively, defined by the base member 202. The pockets 230/232 are defined, in part, by lip portions 234 and 236, respectively, which are coplanar with the upper surface of the support surface member 204.

The table assembly 200 works in a manner similar to the work table assembly 108. One difference is that the carriage assemblies 214/216 include only three wheels (220, 222, and 224). Only three wheels are used since the wheels 220/222/224 only provide for stability and movement between the base member 202 and the support surface member 204. The wheels 220/222/224 do not directly maintain the table assembly 200 in an assembled condition.

Rather, the components of the table assembly 200 are maintained in an assembled condition by the pockets 230/232 which enclose the carriage assemblies 214/216 and flanges 206/208. Accordingly, when the table assembly 200 is incorporated into the system 100, movement of the support surface member in a cross axial direction (i.e., a direction other than along the axis 190) is controlled. Movement of the carriage assemblies 214/216 out of the pockets 230/232 along the axis 190 of the table assembly 200 (i.e., a direction toward or away from the blade 102) may be controlled using stops similar to the stop plugs 182.

It will be appreciated that in the carriage assemblies 214/216, the carriage body 218 ensured the wheels 222 and 224 remained spaced apart along the axis 190 so as to provide stability for the work support member 204. In some embodiments, one or more of the carriage bodies is omitted. By way of example, FIG. 9 depicts a table assembly 250 that in some embodiments is used in place of the table assembly 108. The table assembly 250 includes a base member 252 and a support surface member 254. The base member 252 includes two flanges 256 and 258 which extend inwardly. In this embodiment, pockets 260/262 are defined by upper flange portions 264/266 and lower flange portions 268/270 of the support surface member 254.

One carriage assembly 280 is positioned on the flange 256. The carriage assembly 280 may include three or more wheels. In one embodiment, the carriage includes four wheels 282, 284, 286, and 288 as depicted in FIG. 10. The wheels 282, 284, 286, and 288 are rotatably supported by a carriage body 290 and in rolling contact with both the base member 252 and a support surface member 254. Specifically, the wheels 282 and 284 contact the upper flange portion 264 and the flange 256 while the wheels 286 and 288 contact the lower flange portion 268 and the flange 256. Because the wheels 282, 284, 286, and 288 maintain a relatively fixed spacing between the base member 252 and a support surface member 254, the wheels 282 and 284 need not be connected through the carriage body 290 to the wheels 286 and 288. Accordingly, in one embodiment the carriage body 290 is split into two sub carriage bodies, each sub carriage body supporting two wheels.

Rather than a carriage assembly within the pocket 262, two rack and pinion assemblies 292 and 294 are provided. The rack and pinion assemblies 292 and 294 are substantially identical and are described with reference to rack and pinion assembly 292 as depicted in FIG. 11. The rack and pinion assembly 292 includes two racks 296 and 298. The rack 296 is mounted to the upper flange portion 266 while the rack 298 is mounted to the flange 258. The racks 296/298 may be flush mounted to or formed (molded) or machined into the support structure.

The rack and pinion assembly 292 further includes two pinions or gears in the form of wheels 300 and 302. The wheels 300 and 302 are meshingly engaged with both the rack 296 and the rack 298. Because the wheels 300 and 302 are toothed, spacing between the wheels 300 and 302 is automatically maintained. Accordingly, there is no need for a carriage body to maintain distance between the wheels 300 and 302 along the axis 190. Moreover, because of the pocket and flange configuration, a carriage body is not required in order to maintain the desired vertical (with respect to the view of FIG. 9) relationship between the base member 252 and a support surface member 254. Accordingly, some embodiments incorporate a rack and pinion arrangement in place of a carriage assembly in both pockets.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A saw system comprising:
   a base;
   a saw power head assembly defining a cutting axis;
   a work support surface member supported by the base and including a work piece support surface defining a horizontal work piece support plane; and
   a plurality of wheels, each of the plurality of wheels supporting the work support surface member above the base and engaged with at least one of the base and the work support surface member such that the work support surface member is movable along the cutting axis, wherein each of the plurality of wheels is axially movable along the cutting axis with respect to both the base and the work support surface member.

2. The saw system of claim 1, wherein each of the plurality of wheels is engageable with both the base and the work support surface member.

3. The saw system of claim 2, wherein:
   each of the plurality of wheels defines an axis of rotation that extends in a horizontal plane; and
   at least one of the axes of rotation is located in a horizontal plane that is vertically higher than the horizontal plane of another of the axes of rotation.

4. The saw system of claim 3, wherein at least one of the plurality of wheels is engageable with a first rack attached to the base and with a second rack attached to the work support surface member.

5. The saw system of claim 1, further comprising a carriage body, wherein the plurality of wheels comprises:
   a first wheel rotatably supported by the carriage body;
   a second wheel rotatably supported by the carriage body; and
   a third wheel rotatably supported by the carriage body.

6. The saw system of claim 5, wherein each of the first wheel, the second wheel, and the third wheel is engageable with both the base and the work support surface member.

7. The saw system of claim 5, wherein:
   the first wheel is engageable with the base but is not engageable with the work support surface member;
   the second wheel is engageable with the work support surface member but is not engageable with the base; and
   the third wheel is engageable with both the work support surface member and the base.

8. The saw system of claim 7, wherein:
   the base defines a first guide slot and a second guide slot;
   the third wheel is engageable with the first guide slot; and
   the first wheel is engageable with the second guide slot.

9. The saw system of claim 8, wherein:
   the second guide slot includes a first portion with a first diameter and a second portion with a second diameter;
   the first diameter is larger than the second diameter; and
   the first wheel is engageable with the first portion and the second portion.

10. A saw system, comprising:
a base;
a tile saw power head assembly supported above the base and defining a cutting axis;
a first wheel engaged with the base;
a work support surface member defining a horizontal work piece support plane and movable with respect to the base along the cutting axis; and
a second wheel engaged with the work support surface member, wherein
the first wheel and the second wheel support the work support surface member above the base and are axially movable with respect to the base and the work support surface member along the cutting axis, and are used to move the work support surface along the cutting axis with respect to the base.

11. The saw system of claim 10, wherein:
the first wheel is engageable with the work support surface member; and
the second wheel is engageable with the base.

12. The saw system of claim 10, wherein:
the first wheel defines a first axis of rotation;
the second wheel defines a second axis of rotation; and
the first axis of rotation is located in a plane that is vertically higher than a plane in which the second axis of rotation is located.

13. The saw system of claim 12, wherein at least one of the first wheel and the second wheel is engageable with a first rack attached to the base and with a second rack attached to the work support surface member.

14. The saw system of claim 10, further comprising a carriage body, wherein:
the first wheel is rotatably supported by the carriage body;
the second wheel is rotatably supported by the carriage body; and
a third wheel is rotatably supported by the carriage body.

15. The saw system of claim 14, wherein each of the first wheel, the second wheel, and the third wheel is engageable with both the base and the work support surface member.

16. The saw system of claim 14, wherein:
the first wheel is engageable with the base but is not engageable with the work support surface member;
the second wheel is engageable with the work support surface member but is not engageable with the base; and
the third wheel is engageable with both the work support surface member and the base.

17. The saw system of claim 16, wherein:
the base defines a first guide slot and a second guide slot;
the third wheel is engaged with the first guide slot; and
the first wheel is engaged with the second guide slot.

18. The saw system of claim 17, wherein:
the second guide slot includes a first portion having a first diameter and a second portion having a second diameter;
the first diameter is larger than the second diameter; and
the first wheel is engageable with the first portion and the second portion.

* * * * *